(12) United States Patent
Sale (10) Patent No.: US 10,438,294 B2
(45) Date of Patent: *Oct. 8, 2019

(54) SYSTEM AND METHOD FOR PERFORMING CONCURRENT DATABASE OPERATIONS ON A DATABASE RECORD

(71) Applicant: William Sale, New York, NY (US)

(72) Inventor: William Sale, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/135,099

(22) Filed: Sep. 19, 2018

(65) Prior Publication Data

US 2019/0087907 A1    Mar. 21, 2019

Related U.S. Application Data

(63) Continuation of application No. 14/923,663, filed on Oct. 27, 2015, now Pat. No. 10,109,015.

(60) Provisional application No. 62/068,846, filed on Oct. 27, 2014.

(51) Int. Cl.
| | |
|---|---|
| *G06Q 40/08* | (2012.01) |
| *G06Q 50/16* | (2012.01) |
| *G06F 16/23* | (2019.01) |
| *G06F 16/2457* | (2019.01) |

(52) U.S. Cl.
CPC ......... *G06Q 40/08* (2013.01); *G06F 16/2308* (2019.01); *G06F 16/2365* (2019.01); *G06F 16/2379* (2019.01); *G06F 16/24575* (2019.01); *G06Q 50/163* (2013.01)

(58) Field of Classification Search
CPC ...... G06Q 40/00; G06Q 40/08; G06Q 50/163; G06Q 40/025; G06F 17/30371; G06F 17/30377; G06F 17/30528
See application file for complete search history.

(56) References Cited

U.S. PATENT DOCUMENTS

| | | | | |
|---|---|---|---|---|
| 8,301,469 | B1* | 10/2012 | Veldhuizen | G06Q 40/025 |
| | | | | 705/38 |
| 2005/0256794 | A1* | 11/2005 | Colby | G06Q 40/00 |
| | | | | 705/35 |
| 2006/0106640 | A1* | 5/2006 | Deline | G06Q 10/10 |
| | | | | 705/2 |

(Continued)

*Primary Examiner* — Lalita M Hamilton
(74) *Attorney, Agent, or Firm* — Meister Seelig & Fein LLP; Seth H. Ostrow (57) ABSTRACT

A method and system for handling data field tasks, the system comprising a database containing records and data fields associated with real estate ownership expense insurance policies that reimburses for increases in property ownership expenses including increases in maintenance fees and assessments from non-covered losses, an underwriting server communicatively coupled to one or more client devices and data sources over a communications network, the underwriting server comprising a processor that configures processes to the data sources and generates data source connections to receive information from the data sources, and a scheduler that allocates threads within the processes to at least one of the data fields associated with premium for coverage, expenses, and reimbursement of the real estate ownership expense insurance policies, and assigns the threads to tasks for performing operations on the at least one of the data fields based on the information from the data sources.

20 Claims, 6 Drawing Sheets

(56) References Cited

U.S. PATENT DOCUMENTS

2010/0211484 A1\* 8/2010 Malcolm ............... G06Q 10/10
705/30

\* cited by examiner

SYSTEM AND METHOD FOR PERFORMING CONCURRENT DATABASE OPERATIONS ON A DATABASE RECORD

CROSS REFERENCE TO RELATED APPLICATION

This application is a continuation of U.S. patent application Ser. No. 14/923,663, entitled "SYSTEM AND METHOD FOR PERFORMING CONCURRENT DATABASE OPERATIONS ON A DATABASE RECORD," filed on Oct. 27, 2015, which claims the priority of U.S. Provisional Application No. 62/068,846, entitled "SYSTEM AND METHOD FOR PROTECTING AGAINST FLUCTUATIONS IN FINANCIAL OBLIGATIONS RELATED TO REAL ESTATE PROPERTY," filed on Oct. 27, 2014, the disclosure of which is hereby incorporated by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

The invention described herein generally relates to updating data in databases, and in particular, employing data field-specific thread tasking for database operations.

Description of the Related Art

Devices such as notebook computers, handheld computers and data enabled cellular telephones permit data synchronization with a different computing device, for example a server computer. Data synchronization may refer to the harmonization of data between two data sources such that the data contained in each data source can be reconciled notwithstanding changes to the data applied in either or both of the data sources. During synchronization, a client device can retrieve data updates since a last synchronization from a local data store and provides those updates to a host device. The host device applies the updates to the host data store and provides updates since the last synchronization from the host data store to the client device.

The client, upon receipt of the host updates, iterates through each update applying the same to the local data store. Once all updates have been applied locally, the client device can provide updated mapping information to the host device in order to facilitate subsequent synchronizations. As such, the serial nature of client side updates can render synchronization susceptible to failure conditions and slow responsiveness. The processing in the client device can be slow compared to processing in the server and the network link further can inhibit the speed of synchronization. Moreover, in as much as the client device must wait for the completion of the update process in the local data store before forwarding an indication of completion to the host device, substantial delays can be incurred where the update process is slow due to the nature of the client device. Furthermore, such synchronization fails to account for the reality of traffic transfer with the bulk of the update traffic in a synchronization process stemming from the host device rather than the client device.

For example, managing risks associated with real estate ownership, particularly residential real estate ownership, requires data systems that can process concurrent changes in data from a plurality of data sources in a timely manner. Condominium and co-op owners face unpredictable and potentially unlimited liability for unit maintenance fees. Maintenance fees and common charges are considerable monthly expenses, and can rise steeply and without warning. Unit owners are liable for the full amount of fees owed upon demand and payment cannot be deferred (as it could at the owner's discretion for a single-family home). Units have limited liquidity and cannot be easily sold to avoid increased maintenance obligations. Maintenance costs have a direct impact on a unit's market value. Extreme maintenance fee increases can harm unit owners in more ways than the immediate financial stress of increased monthly outlays. Higher maintenance fees may also depreciate a unit's value and decrease salability of high-maintenance units, further restricting one's ability to avoid increased costs.

All residential and commercial property owners face uncertain future property tax obligations. Strained municipal finances and spiraling property values in certain urban areas (relative to recession-era assessments) can result in substantial increases to property tax assessments and similar obligations. Owners have little visibility into the timing or magnitude of changes in tax assessments that can materially impact the economics of property ownership. Buildings, communities and tax authorities typically use a fixed annual convention to determine budgeting and rate levels. Most often, in the case of condominiums and cooperatives, a calendar year serves as the basis for budgeting and billing for maintenance fees and common charges. Additionally, certain non-recurring or exceptional expenses and obligations may arise outside of the typical reporting and payment cycles (assessments, levies, etc.). For example, a condominium management company may face an unforeseen maintenance obligation (elevator repair, roof replacement, storm damage remediation, etc.) that may exhaust available reserve funds on hand, and that cannot be deferred into a future reporting period and funded via a typical annual maintenance rate increase.

Ongoing maintenance, fee and tax expenses may generally rise gradually and thus not cause tremendous financial difficulty for unit owners. Unit owners might not want to diversify this gradual inflation-type risk, unless they are on restricted incomes or are otherwise so inclined. However, every unit owner is at risk of sharp increases from truly unknown risks that can imperil personal finances and housing unit value. For example, an assessment to pay for a major building renovation or repair costs for a buckling façade. Building insurance may cover some reconstruction costs, but substantial fee increases would still be expected, not least because of exhausted reserves and rising building insurance premiums.

Concurrent changes in information from a plurality of information sources are critical in determining fluctuating costs and, in particular, increases in maintenance, taxes, and other real estate property-related expenses. Thread synchronization mechanisms can be used to ensure that two or more concurrent processes or threads do not simultaneously execute a critical section (e.g., task to access a shared resource) to a shared resource at the same time such as a shared memory in a database. When one thread starts executing the critical section, other threads should wait until the first thread finishes. Although existing techniques can be used as a means of ensuring transaction synchronicity when making transaction processing concurrent (interleaving transactions), such mechanisms require tying up more time and other resources than may be required (e.g., inefficient use of mutual exclusion devices that cause deadlocks, starvation, and the like). As such, there is a need for an alternative synchronization mechanism to support constant data fluctuations.

SUMMARY OF THE INVENTION

The present invention provides a system and associated methods for handling data field tasks, the system comprising a database containing records and data fields associated with, for example, real estate ownership expense insurance policies that reimburse owners for increases in property ownership expenses including increases in maintenance fees and assessments from non-covered losses. The system includes an underwriting server communicatively coupled to one or more client devices and data sources over a communications network, the underwriting server comprising a processor that configures processes to the data sources and generates data source connections to receive information from the data sources. The system further includes a scheduler that allocates threads within the processes to at least one of the data fields associated with premium for coverage, expenses, and reimbursement of the real estate ownership expense insurance policies, and assigns the threads to tasks for performing operations on the at least one of the data fields based on the information from the data sources.

In one embodiment, the tasks include database operations. The database operations may include create, read, update and delete operations. The scheduler is operable to queue a plurality of the database operations for execution on the at least one of the data fields on a given record. The scheduler can also assign the threads to tasks for performing operations on two or more data fields of a given record concurrently.

In some embodiments, the processor can receive real estate ownership expense insurance policy application information from the one or more client devices and stores the real estate ownership expense insurance policy application information in the database. The real estate ownership expense insurance policy application information may include at least one of a duration of coverage, desired deductible, property location, duration of unit ownership, address, property age, property construction class, property amenities, value of property, unit maintenance pricing history, property tax rates and assessed values, property occupancy or vacancy, and whether the property is a primary home, vacation, seasonal residence, or unoccupied. In a further embodiment, the processor may analyze the real estate ownership expense insurance policy application information to generate quotes. The processor can provide the quotes as alerts identifying non-coverage of assessment risk based on property cost-increase risk events based on the information from the data sources. The increases in property ownership expenses can include assessments from deferred maintenance, wear and tear, capital expenses, water intrusion, settling, and earth movement. The information from the data sources may include at least one of duration of unit ownership, property location, susceptibility to storm damage, insurance costs, repair costs, neighborhood and building demographics, average household income within the unit's building and neighborhood, property age, property construction class, property amenities, number of units within the building, number of floors, unit pricing history, unit maintenance pricing history, risk exposure, property tax rates and assessed values, property occupancy or vacancy, decision-making authority of applicant in property administration entity, profiles of condo association members, applicant credit score, and claims history.

In one embodiment, the processor calculates reimbursement for assessment using $a*x-(m_c*r)$, where $a$=assessment; $x$=assessment term; $m_c$=total maintenance obligation in the coverage period; and $r$=retained liability. In another embodiment, the processor calculates reimbursement for annual increase in maintenance=$(i-r_r)*m_c$, where $i$=increase in maintenance obligation in reimbursement year; $r_r$=remaining retained liability; and $m_c$=total maintenance obligation in the coverage period.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

Databases include collections of data stored in computers, servers, mainframes or other computing devices and software programs to manipulate the data. A database may store and maintain schemes, tables, queries, reports, views and other objects. Databases may support internal operations of organizations or support online interactions with customers and suppliers. Databases can be used to hold administrative information and more specialized data, such as engineering data or economic models. Examples of database applications include computerized library systems, flight reservation systems and computerized parts inventory systems. Other applications include banking (e.g., for customer information, accounts, and loans, and banking transactions), airlines (e.g., reservations and schedule information), universities (e.g., student information, course registrations, and grades), finance (e.g., storing information about holdings, sales, and purchases of financial instruments such as stocks and bonds), sales (e.g., customer, product, and purchase information), manufacturing (e.g., management of supply chain and for tracking production of items in factories, inventories of items in warehouses/stores, and orders for items), and human resources (e.g., information about employees, salaries, payroll taxes and benefits, and for generation of paychecks).

According to embodiments of the present invention, threads within a process, such as a database update, are programmed for parallel reading and writing of common data objects within one or more databases such that two or more concurrent processes and threads are prevented or inhibited from simultaneous access to a shared data field. Computer processes may be allocated computing resources to particular data sets within the one or more databases. Computing resources include physical and/or virtual components of finite availability within a computer system such as network connections, bandwidth, throughput, memory space, and processing time.

Figure 1:
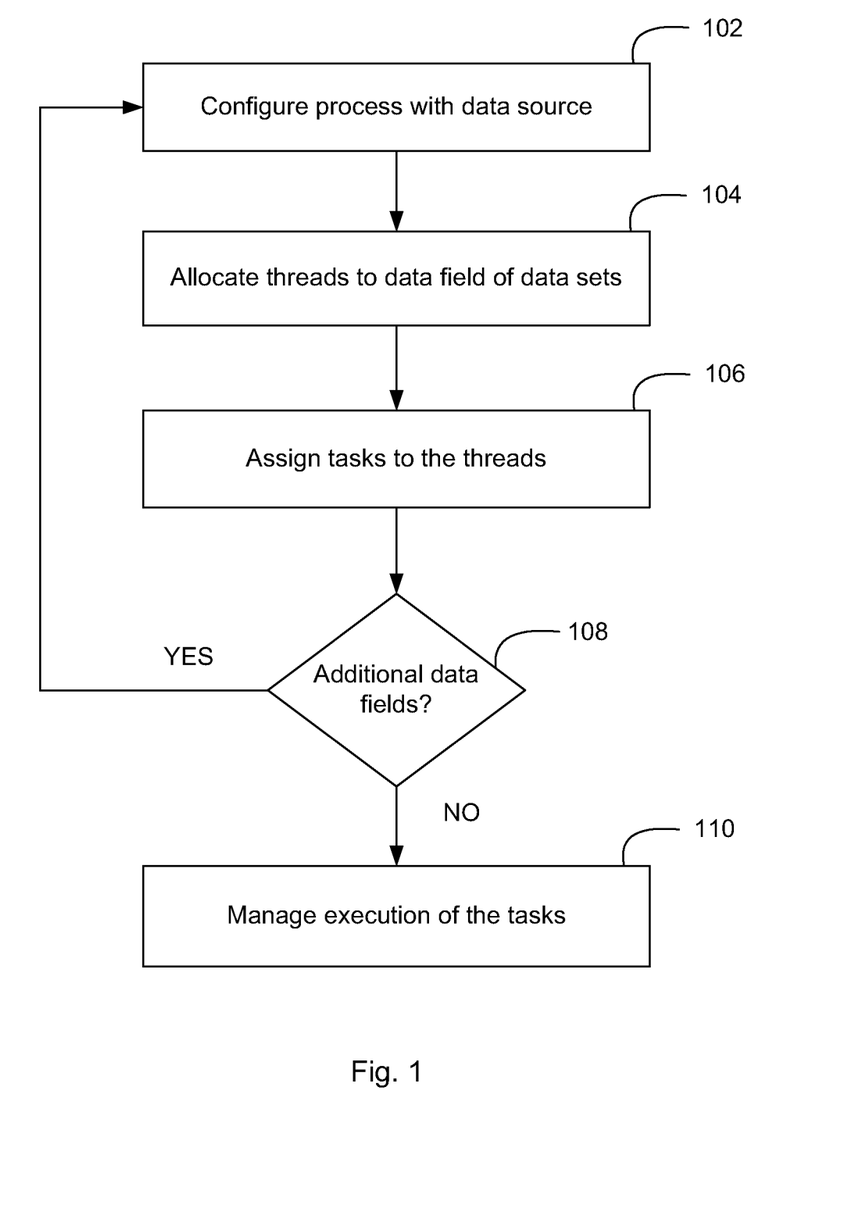
FIG. 1 illustrates a flowchart of a method for configuring computing resources of a computing device according to an embodiment of the present invention.

FIG. 1 illustrates a flowchart of a method for configuring computing resources of a computing device according to an embodiment of the present invention. A process is configured with a given data source, step 102. The process may be executed by a server or other computing devices and communicatively connected with the given data source to retrieve data to modify one or more data sets. A process includes one or more threads (of execution) containing programmed instructions that can be managed to perform a subset of the process. The one or more threads may be executed in parallel to perform the various subset of the process such as communication with the given data source, retrieving information from the given data source and performing a data operation on the one or more data sets.

A data set may include a subset or an entirety of records within a database. In one embodiment, the one or more data sets may include data from a plurality of databases. Data sources may include servers and databases storing data that can be retrieved upon a trigger event or on a periodic basis. According to embodiments of the present invention, the server or computing device may further simultaneously execute a plurality of processes to retrieve data from a plurality of data sources. Each of the processes may be configured to a specific one of the plurality of data sources. As such, an update, for example, to the one or more data sets may be partitioned into multiple update operations and data exchanges. Threads of the process are allocated to a given data field of one or more data sets, step 104. Allocation of the threads may be performed by a scheduler. The threads are configurable such that the threads perform tasks for or dedicated to a specific data field(s) of the one or more data sets.

Threads are assigned to tasks, step 106. The threads may be assigned by the scheduler to perform database operations on records and their data fields such as create, read, update and delete operations. Threads can independently execute code that operates on values and objects residing in a shared main memory. Threads may be supported by having many hardware processors, by time-slicing a single hardware processor, or by time-slicing many hardware processors.

Data from data sources can be used by the threads to access and modify data in the given data field. A thread can be assigned to detect a change or a trigger event associated with a data source. Upon detecting change, another thread may query the corresponding data field of records in the data set to determine records to modify. A first thread may be tasked with reading data in the given data field for records contained in the one or more data sets, a second thread may request data from the data source based on the reading and receive the data from the data source, a third thread may compare the data in the given data field with the received data, and a fourth thread may update the data in the given data field for the records in the one or more data sets based on the data received from the data source.

The one or more data sets may contain a plurality of data fields. Whether additional data fields that can be updated via a data source are identified, step 108. The system proceeds to step 102 to configure an additional process with a data source. Multiple processes may be configured for updating the data fields of the one or more data sets with a plurality of data sources.

If there are no further data fields, execution of the tasks is managed, step 110. Database operations can be managed to execute concurrently on a data field in addition to simultaneously accessing and modifying multiple data fields in a record. For example, the first thread of a first process may be scheduled to read a first data field of a first record while queuing (e.g., first-in-first-out (FIFO) or non-preemptive priority scheduling) the fourth thread to update the first data field of the first record upon completion of the read operation by the first thread. The first thread may be further scheduled to read a first data field of a second record after reading the first data field of the first record, then of which the fourth thread is scheduled to update the first data field of the second record when the update operation on the first data field of the first record is completed. In a multi-process scenario for updating two data fields, for example, a first thread of a second process may be scheduled to read a second data field of the first record while queuing a fourth thread of the second process to update the second data field of the first record upon completion of the read operation by the first thread of the second process. The first thread of the second process may be further scheduled to read a second data field of a second record after reading the second data field of the first record, then of which the fourth thread of the second process is scheduled to update the second data field of the second record when the update operation on the second data field of the first record is completed by the fourth thread of the second process. The descriptions provided are merely examples are not intended to limit the number, functionality and scheduling of threads.

When multiple threads can read/write to a single object, it is critical that those read/writes be synchronized. Otherwise, one thread might interrupt with the execution of another thread, and the object could be left in an invalid state. Mutual exclusion devices such as locks, semaphores, monitors, and other forms of concurrency control may be used to further prohibit threads from accessing a same data field.

The field of insurance is an exemplary application where embodiments of the present invention may be implemented. Particularly, in computing systems that support protection and insurance coverage to mitigate specific financial risks associated with real estate ownership. Broadly, there are three categories of financial risk in any owner-occupied residential real estate transaction: the costs of purchasing a property, the costs of owning and maintaining a property, and the costs or gains or losses of selling the property. Costs and liabilities associated with purchasing a property (financing a property) can be fixed. An owner who finances a property purchase with a 30 year fixed-rate mortgage will know exactly what her monthly mortgage expenses will be for the next 30 years, and they will not change over that time. The remaining categories of costs are sources of unknown and variable financial risk. Properties may need much routine maintenance and upkeep, or little maintenance. They may be in storm-prone areas, or suffer from unexpected mechanical failures or structural deficiencies. They may be required by local authorities to undertake certain investments to meet building code standards. They may be in a city experiencing rapid investment that drives up property prices and construction costs, and tax assessments and maintenance costs along with them. A rise or fall in prices can lead to a substantial gain or loss on investment upon sale of a property. All of these unknowns present varying levels of financial risk that an owner cannot fix and cannot mitigate.

Systems and methods for providing real estate ownership expense protection described herein are intended to alleviate certain ongoing financial risks of property ownership by insuring property owners against increases in covered recurring maintenance and assessment fee expenditures. Real estate ownership expense insurance according to at least one embodiment of the present invention compensates for ongoing fee or tax expenses for a determined period by transferring risks of rising financial obligations from the owner and product contract/policyholder to the policy issuer. Real estate ownership expense protection may be embodied by means of a financial product, insurance, rider, option, or contract that ensures monthly cost stability and visibility, and eliminates the risk of catastrophic increases in costs associated with real estate ownership. Condominium and cooperative unit owners may be covered for maintenance fee and property tax liabilities (combined or separate for condominiums, necessarily combined for cooperatives). Owners of homes in communities with homeowners associations may be covered for homeowners association (HOA) dues or fees, and taxes. Traditional single family homeowners can be provided property tax coverage. Institutional owners in combined apartment/condo/HOA developments may be covered for maintenance/HOA dues and/or taxes.

Real estate ownership expense insurance further provides protection to condominium owners for assessments arising from items that are not covered by the HOA master insurance policy. Items that are typically covered under HOA master policy include damage from fire, lawsuits against the condominium from a bodily injury, or property occurrences such as a weather-related roof collapse. However, other events such as deferred maintenance/wear and tear, capital expenses, water intrusion, settling/earth movement, and atypical events are not covered. In addition, the real estate ownership expense insurance may also cover increases in common charge maintenance bills and items excluded from coverage by loss assessment such as an assessment charged to cover the cost of improvement and maintenance projects where there is no covered loss (e.g., painting the hallways simply because the association decided it was time to paint). The system of the present invention may also be used in other fields such as in healthcare, government, banking, and accounting, to name a few.

Figure 2:
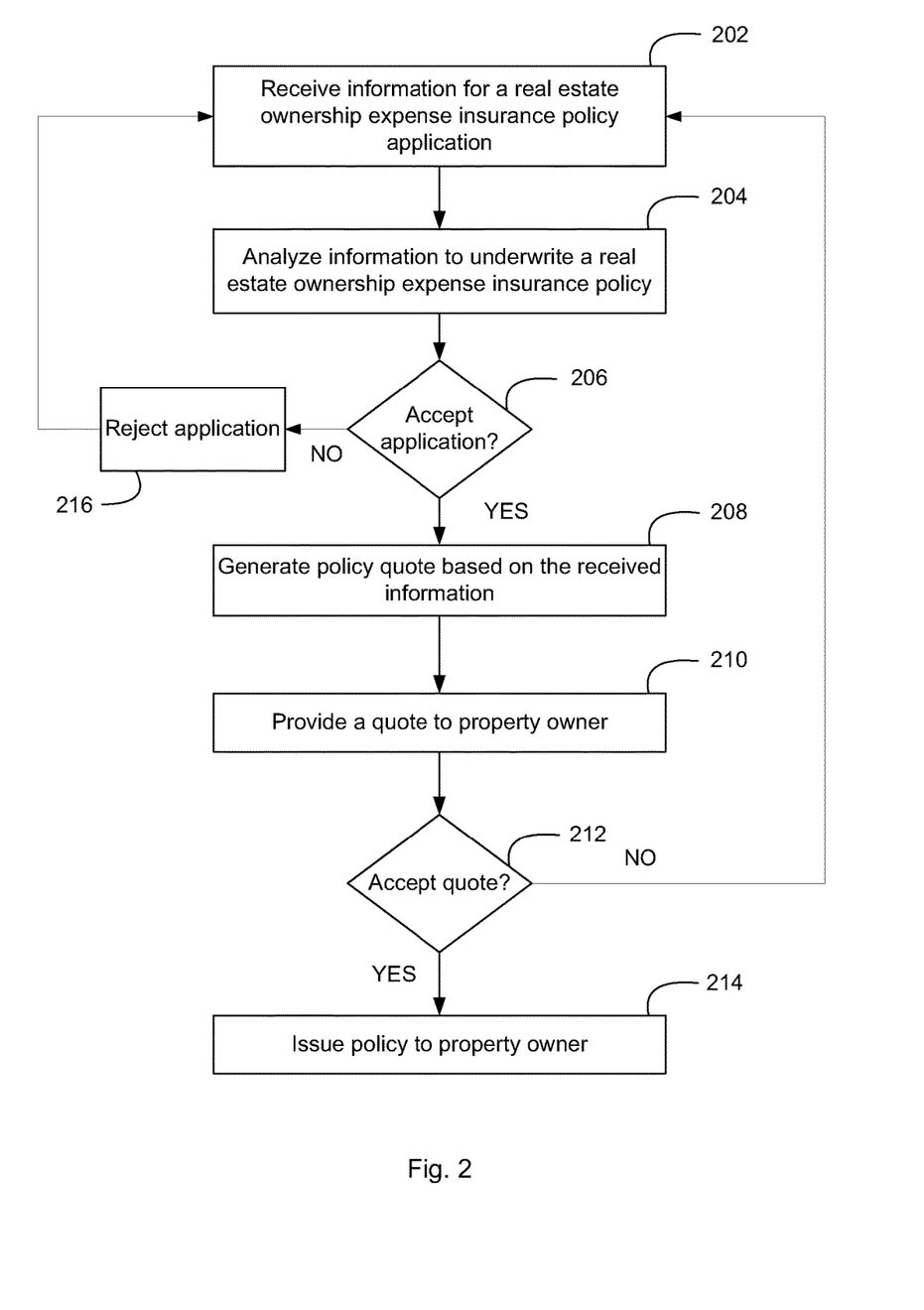
FIG. 2 illustrates a flowchart of a method for generating an exemplary data set item according to an embodiment of the present invention.

FIG. 2 presents a flowchart of a method for generating an exemplary data set item associated with providing real estate ownership expense insurance according to an embodiment of the present invention. Information for a real estate ownership expense insurance policy application is received at a server, step 202. Receiving the information may include monitoring of an electronic message or signal indicating a transmission of data comprising the information (optionally, in a given format) and storing the information in a database or storage device. The information may be useful for issuing or otherwise computing a premium, losses, deductibles, or reimbursement for a real estate ownership expense insurance policy that reimburses for fluctuations or unexpected increases in maintenance fees, taxes, and other property ownership expenses. For example, a property owner (or policy applicant) may electronically submit information associated with an application or questionnaire for real estate ownership expense insurance to the server from a computing device using an electronic user and/or web interface. Alternatively, the information may be electronically transmitted to the server by an agent, salesperson, broker or an employee of an insurer from a client interface of a computing device. The insurer may be an insurance company, a guarantor, an employer, a private party, agents thereof, etc., that underwrites an insurance risk and/or the party in an insurance contract undertaking to pay a compensation. The information may include but not be limited to duration of coverage, desired deductible, property location, duration of unit ownership, address, property age, property construction class, property amenities (swimming pool, parking garage, etc.), value of property, unit maintenance pricing history, property tax rates and assessed values, property occupancy or vacancy, and whether the property is a primary home, vacation/seasonal residence, or unoccupied.

The received information is analyzed to underwrite a real estate ownership expense insurance policy, step 204. Analyzing the information may include the server parsing data fields from the information and verifying the information (matching the data fields) such as property address and ownership of record (to ensure insurable interest). Verifying the information includes activities performed by the server such as searching, retrieving, or querying public and private electronic databases containing data records that confirm the application information received by the server. Additionally, analyzing the information may include the server assessing risk based on a credit report and criminal record of the property owner, tax history of the property, building and area demographics, building permits, maintenance pricing history, etc. In one embodiment, the server may retrieve and aggregate secondary information associated with the property to assess risk. Secondary information may include but not be limited to social media content, property transaction history, neighborhood demographics, census information, and geological information.

Based on the analysis performed by the server, an approval decision or scoring of the policy application for an approval decision may be determined, step 206. The policy application may be rejected, step 216, if for example, the risk presented by the policy application exceeds a given underwriting threshold. A rejection message, signal or flag in memory storage/database may be configured to notify that the application has been rejected. Otherwise, if the policy application is in condition for approval, a policy quote for an insurance contract is generated for the property owner based on the received information, step 208. Generating the policy quotes includes calculating at least one of a premium, a coverage period, losses, deductibles, restrictions, and reimbursement benefit via the server (see Appendix). Variables and equations listed in the Appendix may be stored in data fields for each record corresponding to a policy file. The policy quote may be recorded as a data record in a database and populated with fields corresponding to the calculations. Premium pricing, coverage periods, losses, deductibles, restrictions and reimbursement benefits can include consideration and ensuring of both economic return on capital for the contract provider and risk-based assessments of underwriting profitability. Factors used in assessment of risk and determination of probable loss may reflect assessable factors that are positively or negatively correlated with loss patterns (e.g., using data and pattern analysis techniques based on the received information or otherwise retrieved by the server from data sources), including, but not limited to duration of unit ownership (new vs. existing buyers), property location, susceptibility to storm damage, insurance costs, repair costs, neighborhood and building demographics, average household income within the building and neighborhood, property age, property construction class, property amenities (swimming pool, parking garage, etc.), number of units, number of floors (proxy for number of elevators, size of roof), property/unit pricing history, property/unit maintenance pricing history, risk exposure, property tax rates and assessed values, property occupancy or vacancy, primary home, vacation/seasonal residence, unoccupied, position of decision-making authority in property administration entity, profiles of condo association members, co-op board, HOA, etc., inbound vs. outbound contact or marketing, response to a solicitation vs. actively seeking protection, applicant credit score, and claims history. Generating the policy quote can include determining expected losses and residual deductibles such as expected loss from assessment, expected loss from increased maintenance obligation, expected residual deductible after assessment, and expected residual retained liability. Additionally, reimbursement payment (insured losses) can also be calculated, for example, by determining reimbursement for assessment, residual retained liability, and reimbursement for annual increase in maintenance.

The generated policy quote may optionally include a delayed implementation that stays the coverage start date by 's' given number of days after a new policy is purchased. For example, a unit owner purchases or enters a contract on Jun. 1, 2014 that runs through the rest of the year. Coverage (eligibility for reimbursement) would begin on July 1 if s=30, covering the six months of the year after the deferral is complete. The contract or policy buyer would only pay for the coverage after the deferral period, or six months of coverage in this example. In yet another embodiment of a delayed implementation, no delays would be necessary for renewed policies. Referring to the above example, if the policy holder renewed their coverage for the year beginning Jan. 1, 2015, there would be no deferral period.

The generated policy quote may also optionally include matching coverage period with reimbursement term for maintenance fee increases. Policyholders electing coverage pay premiums in year 0 to be covered for increases (in base maintenance fee rate or via assessment or similar) due in year 1. Reimbursement recoverable can be limited to the duration of coverage purchased in year 0. Claims may be paid upon notification of a maintenance fee increase to the property owner (and to the insurer) at end of year 0 or early in year 1, based on number of fractional months covered in year 0. Matching duration of periods dissuades moral hazard; policyholders cannot elect coverage for a single month and get a full year's reimbursement benefit in return. For example, a unit owner with monthly maintenance of $1,000 purchases a contract on May 16, 2014 that covers any increase above 10%, or $100 per month. The contract covers the remaining seven months of the year after a 15-day deferral period, providing financial protection against increases on the $7,000 of maintenance ($1,000×7 months) that the unit owner pays for the duration of 2014.

Assessments with notice and/or obligation occurring during the coverage period (e.g., after the deferral and premium payment covering the duration of the year) could be considered for partial or full reimbursement above the retention/deductible threshold, depending on the duration of the policyholder relationship. During the first policy year (e.g., the year in which a newly insured acquires a policy) reimbursement can be limited to the lesser of the coverage period or the assessment term, less applicable deductibles. In subsequent years and with uninterrupted policyholder coverage, assessments would be eligible for reimbursement for the full value of the assessment across the assessment term (and not subject to limited reimbursement tied to the coverage period), less applicable deductibles. Policies that lapse and are subsequently renewed (months or years later) may be considered to be new policies, and thus require reimbursement limitations tied to the coverage period.

In an exemplary scenario according to one embodiment, a unit owner with monthly maintenance of $1,000 purchases a contract on May 16, 2014 that covers any increase above 10%, or $100 per month. The contract covers the remaining seven months of the year after a 15 day deferral period, providing financial protection against increases on the $7,000 of maintenance ($1,000×7 months) that the unit owner pays for the duration of 2014. If the purchaser receives notice of a six-month assessment in December 2014 of $200 per month beginning in January but the base maintenance rate stays flat (a 20% increase overall), the contract provider would reimburse the holder $600 (six months of the residual 10% above the retained 10% deductible). If that policy were purchased on Oct. 16, 2014 with a coverage period beginning on November 1, the policyholder would be eligible for only two months (the shorter of the coverage period and assessment term). If the policyholder purchased an initial policy on Oct. 16, 2013, and subsequently renewed in full for the 2014 policy year, the policyholder would be eligible for reimbursement covering the full six-month assessment term, as the policy would have graduated from the initial year assessment term limitation.

According to another embodiment, multiple year policies may be generated. Multiple year policies may be offered that would consider the coverage/contract election year maintenance amount as the base rate for the duration of the contract. This could provide fixed expenses over a number of years (except for increases below the deductible), but may require premium pricing or higher deductible to allow for expected, general maintenance inflation.

Coverage for open-ended assessments may also be offered in a policy. Assessments levied without specified terms or durations (e.g. "a monthly assessment of $100 will begin on July 1" without reference to an ending date) could be considered for retroactive reimbursement. Reimbursement claims could be made at the end of the coverage period for covered losses incurred during the covered assessment term. For example, an assessment levied in July 2014 upon a property owner whose coverage period runs for the entirety of 2014 could submit a claim for six months of reimbursement ($600) at the expiry of the coverage period, if it were not known at the time of the assessment that the assessment would cover the duration of 2014.

In another embodiment, coverage for multiple year assessments may be offered in a policy. Reimbursement for assessments with stated terms running greater than one year could be eligible for full reimbursement (e.g., 2 years of the additional expense above the deductible, even if the coverage period is one year long), but paid ratably with the coverage period and subsequent renewals. A policyholder who incurs a 2-year assessment may not actually be obligated to pay the entire assessment if he sells his property before the end of the assessment term. Reimbursement could be positioned ratably, so that a unit owner would receive reimbursement tied to the duration of the then-current coverage period. For example, a unit owner with a full 12-month coverage period receives a 24-month assessment beginning on Nov. 1, 2014. The unit owner could claim immediate reimbursement for 12 months of the assessment on November 1. If the owner sells his property in May, he will have received more assessment reimbursement than the liability that he actually will have incurred, but he did have coverage for a full 12-month coverage period, allowing coverage for the full 12 months of the assessment covered by the coverage period. If that policyholder did not renew coverage in 2015, he may not receive any further reimbursement for the assessment above his initial 12 months. If that policyholder did renew coverage in 2015, he may receive further reimbursement for the assessment (covering months 13-24) on Nov. 1, 2015, even if he sells his property on Nov. 2, 2015.

Properties without maintenance fees or dues such as residential or commercial/institutional tax-only product could still acquire coverage for property tax liabilities. Such policy contracts exclude increases in property taxes arising from policyholder improvements/capital investments. For example, a multifamily apartment building adds a new wing, increasing its capacity and value, resulting in a substantially higher property tax obligation. Such an increase would not be covered, as it would be at policyholder's discretion or direction.

Contracts provide financial protection for property owners covering specific properties. If a contract holder sells her covered property during the coverage period, she could be refunded the amount of premium paid covering the date of sale through the end of the coverage period. For example, a unit owner purchases or renews an annual contract on January 1, and sells her covered property on July 1, she could be reimbursed for the six months of paid coverage she no longer needs after the property is sold. In an alternative embodiment, a property owner could potentially transfer the contract to a new owner of the covered property.

Like many insurance-related devices, financial protection plans offering reimbursement for increased financial obligations can be abused or "gamed" by contract buyers. The cost of protection or policy design may consider such risks. A unit owner with advanced knowledge (or high expectation) of a substantial increase in maintenance or a special assessment could enroll in coverage and receive reimbursement. For example, a condo association with stable maintenance costs realizes mid-year that an entire building façade must be replaced, likely exhausting reserves; or a condominium association board's decision in October to levy a substantial assessment in the following year is relayed discretely to a unit owner. An owner in such situations could purchase coverage immediately after learning of such extraordinary events and purchase protection in anticipation of those known increases. Another example includes a member of a condominium association board pushes an initiative to refurbish the building's lobby, a project of dubious value. The project will require both a substantial assessment and an increase in the maintenance rate, but the director campaigns for it believing that his financial protection contract will cover his increased fees so he can only benefit from the refurbishment. In another example, a single family homeowner builds a large addition onto her property. Her tax assessment increases to reflect the value of the new addition, and she claims reimbursement for the increased taxes that were created by her own initiative.

To mitigate such risks, a policy may be created with delayed implementation (as described above), matching term of reimbursement to coverage period to limit exposure and align premium collection/claim period symmetry, particularly in the initial coverage year. Annually-oriented contracts may be purchased with a single lump sum payment as opposed to ratably (mirroring reimbursements, which would likely be paid in single installments, and not ratably). Policies may be offered to cover a full year or the duration of a year as opposed to partial year policies (monthly, for instance) could reduce risk to the insuring party by increasing upfront payment collection.

New policies may carry higher risks of fee/tax increases as owners expecting undisclosed increased costs may seek financial protection to mitigate those costs. Renewed policies may carry lower probabilities of loss, as continuing subscription would suggest a sustained risk mitigation strategy rather than a one-time loss avoidance effort. Accordingly, new policies could require higher retention rates to dissuade initial abuse in first year, when visibility into increases is highest. Renewal policies could be offered with lower retention or attachment points, rewarding continued coverage from year-to-year.

To further reduce risk of gaming, applicants may be required to disclaim advanced knowledge of significant increases or knowledge or anticipation of a claim at time of purchase. Policies may also require representations or disclaimers from contract holders who have distinct decision-making authority (board members of condominiums/cooperatives/HOAs, and single family home-owners). Coverage among unit owners or decision makers may be restricted such as by limiting coverage to no more than, for example, 50% of a building's unit owners or decision-making board members to prevent collusion or gaming.

Once a policy quote for an insurance contract including at least a premium or benefit is computed, the quote may be provided to the property owner, step 210. Systems and methods according to the present invention utilize electronic provision and distribution. The policy quote may be transmitted from a server to a client device of the property owner or an insurance agent, broker, or other salespersons by electronic means such as email, text message, chat message, social media, or provided as an electronic file on a user interface. Providing the quote may include asking the property owner to submit additional information and to agree to certain terms to complete the policy application. In one embodiment, the quote may be provided to property owners as an alert identifying that they are at risk of non-coverage of assessment risk based on certain property cost-increase risk events used to determine the policy quote.

In a further embodiment, step 210 is configurable to be automatically triggered based on information contained in a policy quote that may be saved to cache or another other memory location of the client device of the property owner. The information in the cache or other memory may be periodically updated by the server. The trigger can be set to activate a message or a flag to generate a message based on an elapsed predetermined amount of time or a change to the information in the cache or memory. The flag may comprise data in a browser such as a cookie which may facilitate a given website to generate an advertisement including the quote for the insurance contract. As such, up-to-date values quotes for new policies or renewals may be presented to the user of the client device.

If at step 212 the potential individual declines to purchase the contract or does not accept the policy quote within a predetermined amount of time, the policy quote may either be saved in a database, such as on the computer system described below, for future reference or discarded, and one or more of the steps described above can be repeated for the next potential purchaser. The policy quote may be valid until an expiration date that may be determined by the server. A timer may be set by the server to expire on the expiration date while monitoring for a signal of the acceptance of the policy quote. A signal for acceptance of the policy quote may be received as a corresponding reply to the electronically transmitted policy quote. If the quote is accepted at step 212, the quoted policy may be issued to the property owner at the computed or determined premium at step 214.

Steps required to issue a contract may vary. For example, where the insurer or a party authorized to act on behalf of the insurer transmits the information and acceptance of the policy quote to the server, the contract may issue automatically or at some predetermined time thereafter, e.g., 30 days, etc. If however the transmission of information and acceptance of the policy quote is from an insurance agent with limited authority to bind the insurer, the contract may issue only after first being reviewed and accepted by the insurer. In any event, if the contract issues, the information received and any other relevant information are stored in an appropriate database.

Figure 3:
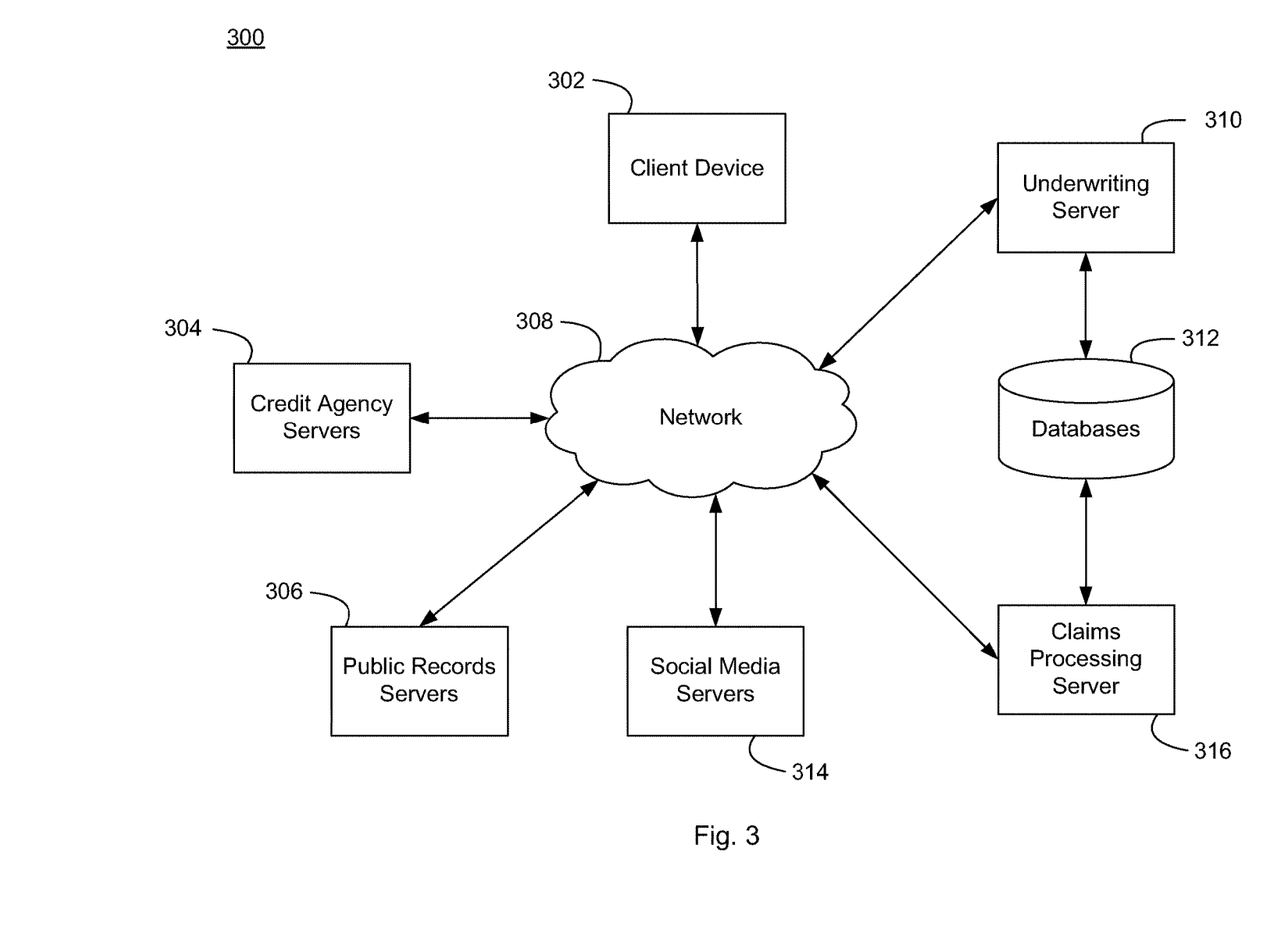
FIG. 3 illustrates a computing system according to an embodiment of the present invention.

FIG. 3 illustrates a computing system according to an embodiment of the present invention. The system presented in FIG. 3 includes client device 302, credit agency servers 304, public records servers 306, social media servers 314, underwriting server 310, claims processing server 316, and network 308. Servers may vary widely in configuration or capabilities but is comprised of at least a special-purpose digital computing device including at least one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Client device 302 may comprise computing devices (e.g., personal computers, mobile devices, terminals, laptops, personal digital assistants (PDA), cell phones, tablet computers, or any computing device having a central processing unit and memory unit capable of connecting to a network). Client devices may also comprise a graphical user interface (GUI) or a browser application provided on a display (e.g., monitor screen, LCD or LED display, projector, etc.). A client device may vary in terms of capabilities or features. A client device may also include or execute an application to communicate content, such as, for example, textual content, multimedia content, or the like. A client device may also include or execute an application to perform a variety of possible tasks, such as browsing, searching, and displaying various forms of content. The foregoing is provided to illustrate that claimed subject matter is intended to include a wide range of possible features or capabilities. A client device may include or execute a variety of operating systems, including a personal computer operating system, such as a Windows, Mac OS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples.

Client device 302 is communicatively coupled to underwriting server 310 over network 308. Network 308 may be any suitable type of network allowing transport of data communications across thereof. The network 308 may couple devices so that communications may be exchanged, such as between a server and a client device or other types of devices, including between wireless devices coupled via a wireless network, for example. A network may also include mass storage, such as network attached storage (NAS), a storage area network (SAN), cloud computing and storage, or other forms of computer or machine readable media, for example. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof. Communications and content stored and/or transmitted to and from client devices may be encrypted using the Advanced Encryption Standard (AES) with a 256-bit key size, or any other encryption standard known in the art.

Property owners may use client devices such as client device 302 to apply for financial protection according to embodiments of the present invention. Specifically, client device 302 is operable to electronically transmit information associated with a policy application to underwriting server 310. Alternatively, the client device 302 may be operated by an agent, salesperson, broker or an employee of an insurer. Underwriting server 310 may receive electronically transmitted information from client device 302 and analyze the information to underwrite and generate policy quotes. Analyzing the information may include the server verifying the information such as property address and ownership of record (e.g., to ensure insurable interest). Additionally, analyzing the information may include the server assessing risk based on a credit report and criminal record of the property owner, tax history of the property, building permits, maintenance pricing history, etc., by accessing credit agency servers 304, public records servers 306, and social media servers 314.

Databases 312 may include actuarial information or tables and records (e.g., property maintenance fees, taxes and histories) useful for risk and underwriting evaluation. Underwriting server 310 may further monitor electronic data from credit agency servers 304, public records servers 306, and social media servers 314 to assess risk associated with policy applications. Credit agency servers 304 may provide credit report data of individuals, entities, or businesses that are accessible by underwriting server 310. Credit agency servers may include servers of credit bureaus, consumer reporting agencies, and financial institutions. According to one embodiment, underwriting server 310 may monitor electronic financial transaction data. Loans and financing can suggest recent capital spending needs and potential near-term investment obligations. Public records servers 306 is operable to provide public records data such as criminal records, property ownership and transactions, title, liens, development plans, permit records, census information, geological surveys, and any other information maintained by federal, state, and/or local government agencies that are accessible to the public. Social media servers 314 provide user content that may be newsworthy and pertinent to underwriting of a policy such as property value, maintenance, and insurance trends. Social media information can indicate trends associated with the policy applicant or property to be covered.

Based on the analysis performed by the server, an approval decision and/or scoring of the policy application for an approval decision may be determined. An approval of a policy application may further cause underwriting server 310 to generate a policy quote. Generating a policy quote includes calculating at least one of premiums, reimbursement benefits, losses, deductibles, and coverage of policies or contracts by the underwriting server 310 according to risk. Underwriting server 310 may electronically transmit the policy quote to a client device of the policy applicant (or agent, etc.) and wait for a signal or electronic response of acceptance (e.g., within a certain time period before expiration). If an electronic response of acceptance is received by the underwriting server 310, a policy contract issues. Information associated with the policy and any other relevant information may be recorded as a data record in databases 312 and populated with fields corresponding to the calculations.

Claims processing server 316 is operable to receive claims for reimbursement of coverage under policies. Claim event and coverage under policy contract are verified by claims processing server 316. If the claim passes the verification, reimbursement payment may begin being distributed to the policyholder.

Figure 4:
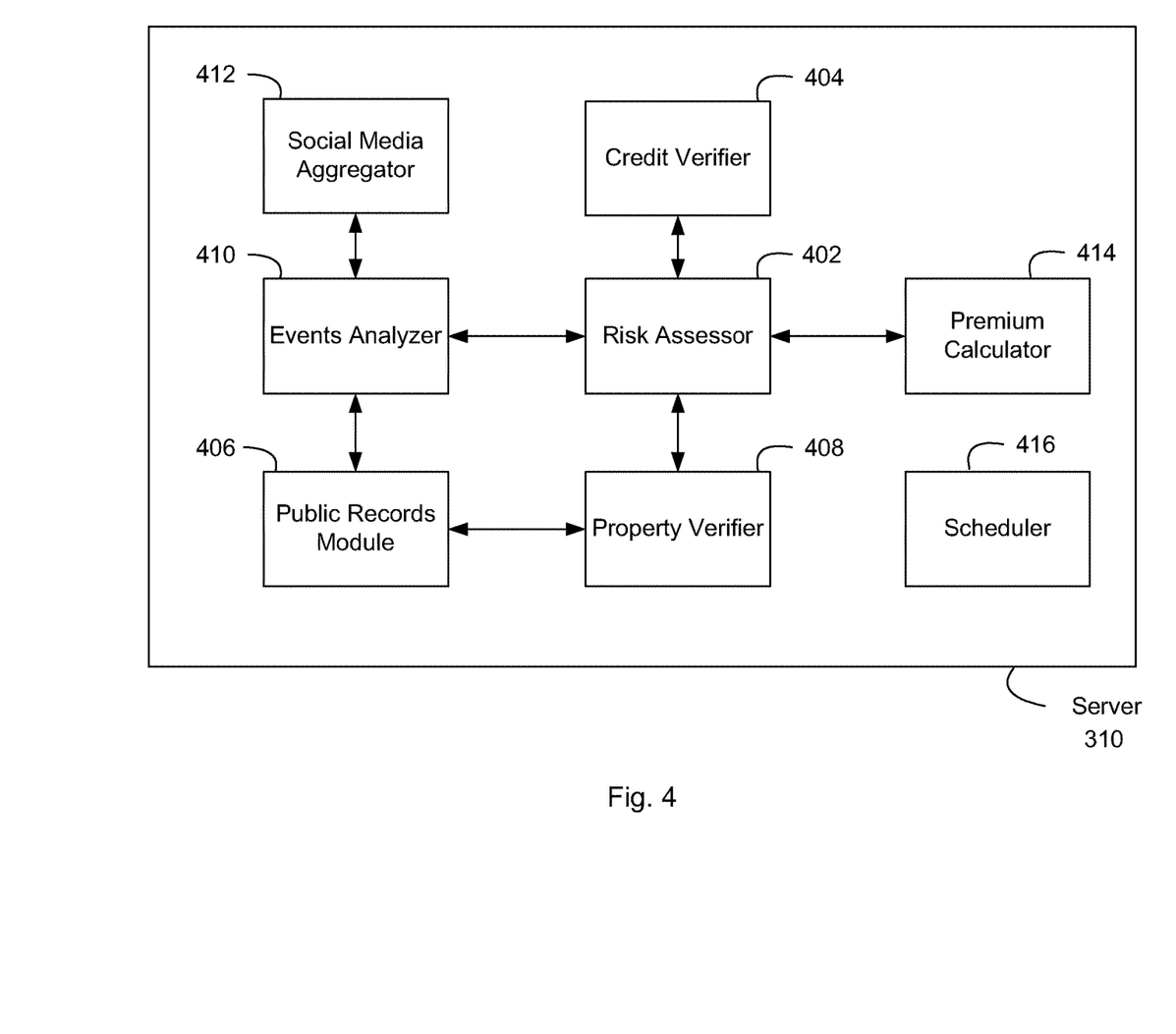
FIG. 4 illustrates server components of a computing system according to an embodiment of the present invention.

FIG. 4 illustrates server components of a computing system according to an embodiment of the present invention. Server 310 comprises risk assessor 402, credit verifier 404, public records module 406, property verifier 408, events analyzer 410, social media aggregator 412, and premium calculator 414. Risk assessor 402 is operable to assess risk, develop risk profiles, and/or perform underwriting activities for policy applications. Data may be aggregated by risk assessor 402 from credit verifier 404, property verifier 408, and events analyzer 410. Credit verifier 404 may be an interface coupled for electronic data retrieval or verification with servers of credit bureaus or financial institutions. Property verifier 408 may access property ownership data via public records module 406. Public records module 406 may be an interface coupled for electronic data retrieval or verification with servers of federal, state, and/or local government agencies. The government servers may include databases having data such as criminal records, property ownership and transactions, title, liens, development plans, permit records, census information, geological surveys, and any other information maintained by federal, state, and/or local government agencies that are accessible to the public.

Events analyzer 410 may also aggregate data from public records servers via public records module 406 to learn of extraordinary events that may pose a risk of imminent cost increases (maintenance, taxes, etc.). Events analyzer 410 may also receive social media content data retrieved from the Internet by social media aggregator 412. Social media may provide content that may be newsworthy and pertinent to underwriting of a policy. Social media information can indicate trends, risk and behaviors associated with the policy applicant or property to be covered. The events analyzer 410 may use data analytics and/or machine learning techniques to discover and communicate meaningful patterns in the public records and social media data.

Server 310 further includes scheduler 416. Scheduler 416 is operable to schedule tasks including retrieving information from external servers (e.g., 304, 306, and 314) and database operations to databases 312. The scheduler may be part of the operating system of server 310 that carries out scheduling activity and decides which process (and its threads) runs at a certain point in time. The schedulers may be implemented to keep all computing resources busy, allow multiple processes to share system resources effectively in multitasking, and to achieve a target quality of service. The scheduler may further maximize throughput (the total amount of work completed per time unit), minimize response time (time from work becoming enabled until the first point it begins execution on resources), or minimize latency (the time between work becoming enabled and its subsequent completion).

Figure 5:
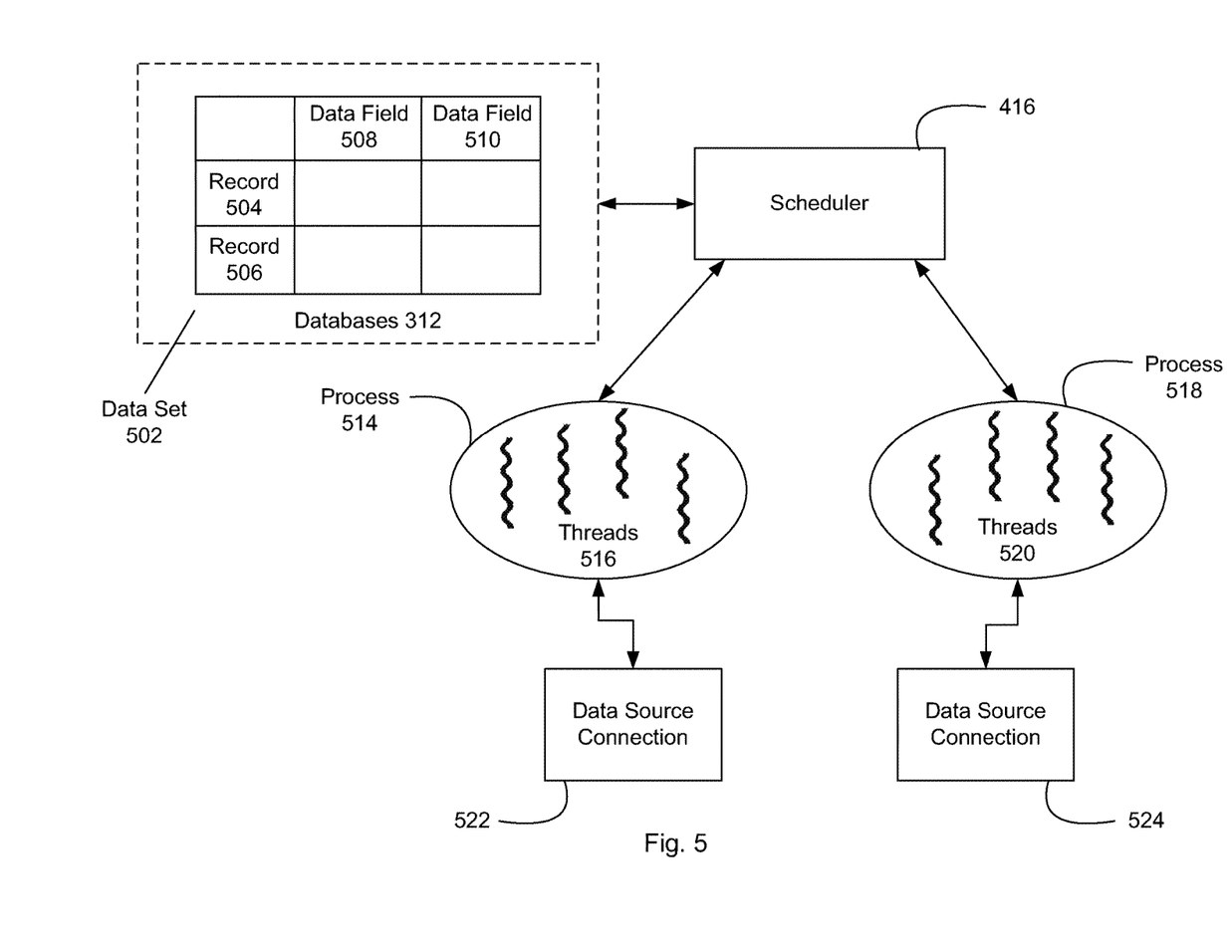
FIG. 5 illustrates additional server components of the computing system according to an embodiment of the present invention.

FIG. 5 illustrates additional server components of the computing system according to an embodiment of the present invention. Databases 312 may contain a data set 502. Data set 502 includes record 504 and record 506. Each of record 504 and 506 contains a data field 508 and a data field 510. Scheduler 416 may schedule the execution of threads 516 of process 514 and threads 520 of process 518. Process 514 and 518 includes tasks such as communicating with data sources, receiving data from the data sources, processing the data from the data sources, and executing database operations on data set 502 based on the data from the data sources.

Each process (and its threads) may be configured to a specific data field. For example, threads 516 of process 514 may be dedicated to tasks associated with data field 508 and threads 520 of process 218 may be dedicated to tasks associated with data field 510. Additionally, each process can be configured to a data source via a data source connection. Data source connection 522 and data source connection 524 may be generated by server 310 to connect the processes to data sources. A data source connection may comprise a socket to facilitate communication to a data source over a computer/communications network. Process 514 may establish communication with a data source by means of data source connection 522 and process 518 may establish communication with a data source by means of data source connection 524. Process 514 and process 518 can establish a communication connection to either a common data source or different data sources. The processes may create threads to listen for data on the data source connections or actively poll the data sources on a periodic basis. Data received by the threads may be used by the other threads to perform processing and database operations as assigned within the processes.

Figure 6:
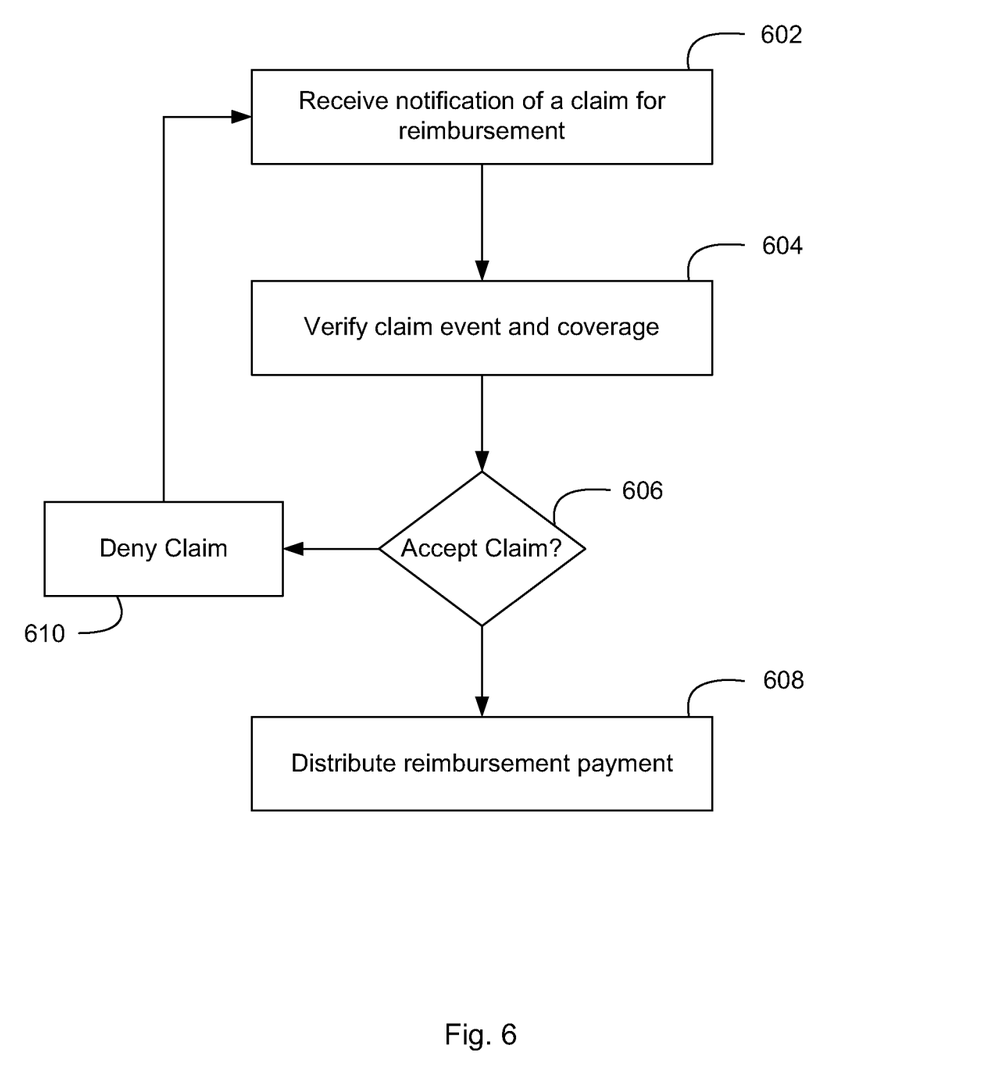
FIG. 6 illustrates a flowchart of a method for administering exemplary data according to an embodiment of the present invention.

FIG. 6 illustrates a flowchart of a method for administering exemplary data associated with real estate ownership expense insurance according to an embodiment of the present invention. A notification of a claim for reimbursement is received, step 602. A claim is generally a request or demand, which is designed to give notice to the insurer regarding an event that triggers payments, which according to embodiments of the present invention, is generally the occurrence of a maintenance fee, special assessment, or tax increase. The claim notification is received by a server for an existing policy contract and the claim may include proof of covered event. The claim may be received from a policy holder in a variety of electronic ways such as through an online interface, email, or through an automated phone system.

Claim event and coverage under policy contract are verified, step 604. Verification generally denotes determining whether or not to provide reimbursement payments in accordance with the policy contract. The claim may be tested with limitations set forth in the policy contract stored within a database for which the claim is being exercised, and any corresponding information related thereto. Verifying the coverage includes determining whether or not one or more conditions, restrictions, or limitations that do not cause the contract to lapse have been satisfied, such as determining whether the contract has expired or the claim is an ineligible cost that is not covered, etc. In another embodiment, verifying the coverage includes determining whether the contract is in effect or has otherwise lapsed. This may occur, for instance, if premium payments were discontinued during the premium payment period. If at step 606 the claim fails the verification with the regard to the conditions, limitations, or restrictions set forth in the policy contract, the claim will be denied at step 610 and the above steps may be repeated for the next or subsequent claims. If the claim passes the verification, reimbursement payment may begin being distributed to the policyholder at step 608.

FIGS. 1 through 6 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

APPENDIX

Formulae and Definitions

Coverage Period=Period for which liability protection is purchased. Measured in fractional months from the Coverage Start Date to the end of the Policy Year $t$=Term of the Coverage Period, in months or fractional months $d$=Issue Date, or the date on which a policy contract is issued $s$=New policy stay period, given as a mandatory number of days after the Issue Date before the Coverage Period begins; will always be equal to zero for renewed policies $c$=Coverage Start Date, or the date on which coverage begins=d+s days $p$=Policy Year, or the year in which a financial protection contract was purchased $q$=Reimbursement Year, or the year following the Policy Year, in which annually-oriented fee obligations and claims are measured $m$=Maintenance, or covered maintenance fees, common charges, or other annual property-related taxes and levies derived from real estate property ownership $m_p$=Total annualized Maintenance obligation in the Policy Year $m_q$=Total annualized Maintenance obligation in the Reimbursement Year $m_c$=Total maintenance obligation in the Coverage Period r=Retained liability, or the deductible applicable to the policy, expressed as a percentage of $m_c$ $r_r$=Remaining retained liability, or the amount of deductible remaining at the end of the Coverage Period, after any adjustments for Assessments incurred, applicable to covered end-of-term increases in Maintenance a=Assessment, or the monthly dollar amount of covered extraordinary temporary assessments, obligations or levies x=Assessment Term=Stated duration, in fractional months, of a special Assessment notice Open-ended Assessment=A special Assessment for which no term is provided by the notifying entity. In such cases, reimbursement claims could be made at the end of the Coverage Period for covered losses incurred during the Covered Assessment Term Covered Assessment Term=In the first Policy Year of any newly issued policy, the lesser of the Coverage Period or Assessment Term. In successive Policy Years, the Assessment Term $NP_c$=Net Premium paid for coverage beginning at time c and extending for t months through the Coverage Period $GP_c$=Gross Premium paid for coverage beginning at time c and extending for t months through the Coverage Period Premium Tax=State insurance premium tax (varied by state), expressed as a percent Policy Fees=Any other non-tax fees levied on insurance policy sales i=increase in maintenance obligation in reimbursement year;

$i_p$=Percentage increase in total annualized Maintenance obligation in Reimbursement Year above Coverage Year $$=(m_q/m_p)-1$$

i'=Expected increase in Maintenance obligation in Reimbursement Year $\%_i$=Probability of % increase in Maintenance obligation in Reimbursement Year $\%_a$=Probability of Assessment during Coverage Period a'=Expected monthly cost of any Assessment x'=Expected duration (Assessment Term) of any Assessment $$NP_c=GP_c*(1-\text{Premium Tax})-\text{Policy Fees}$$

Reimbursements Paid (Insured Losses):

Reimbursement for Assessment=$a*x-(m_c*r)$

Residual retained liability, expressed as a percent of $m_c=r_r$=r-minimum of r or $([a*x]/m_c)$ Reimbursement for annual increase in Maintenance=$(i-r_r)*m_c$ Expected Losses and Residual Deductibles:

Expected loss from Assessment=$\%_a*a'*x'$

Expected loss from increased Maintenance obligation=$\%_i*i'*m_c$

Expected residual deductible after Assessment, expressed in dollars=maximum of: $0, or $(m_c*r^*)-(\%_a*a'*x')$ Expected residual retained liability, expressed as a percent of $m_c$ $(r_r')$=r-minimum of r or $([\%_a*a'*x']/m_c)$

What is claimed is:

1. A system for handling data field tasks, the system comprising:
 a database containing records and data fields associated with real estate ownership expenses;
 an underwriting server communicatively coupled to one or more client devices and data sources over a communications network, the underwriting server comprising:
  a processor that:
   configures processes to the data sources,
   generates data source connections to electronically receive information from the data sources, the data sources including one or more data servers,
   aggregates electronic content that is associated with the real estate ownership expenses from the one or more data servers,
   analyzes the electronic content to determine trends, risk, and behaviors, and
   generates quotes for real estate ownership expense insurance policies that reimburse for increases in property ownership expenses based on the analysis of the electronic content, and
  a scheduler in an operating system of the underwriting server that:
   allocates threads within the processes to at least one of the data fields in a memory location,
   schedules the threads to retrieve the information from the data sources; and
   assigns the threads to tasks for performing operations on the at least one of the data fields based on the information from the data sources, wherein at least one of the threads performs an operation on the at least one of the data fields using the analysis of the electronic content.

2. The system of claim 1 further comprising receiving application information for the real estate ownership expense insurance policies including duration of coverage, desired deductible, property location, duration of unit ownership, address, property age, property construction class, property amenities, value of property, unit maintenance pricing history, property tax rates and assessed values, property occupancy or vacancy, and whether the property is a primary home, vacation/seasonal residence, or unoccupied.

3. The system of claim 1 wherein the processor further assesses the risk based on at least one of: a credit report and criminal record of the property owner, tax history of the property, building and area demographics, building permits, and maintenance pricing history.

4. The system of claim 1 wherein the processor further retrieves and aggregates secondary information associated with the property including property transaction history, neighborhood demographics, census information, and geological information.

5. The system of claim 1 wherein the processor further assesses the risk based on factors including duration of unit ownership, property location, susceptibility to storm damage, insurance costs, repair costs, neighborhood and building demographics, average household income within the building and neighborhood, property age, property construction class, property amenities, number of units, number of floors, property/unit pricing history, property/unit maintenance pricing history, risk exposure, property tax rates and assessed values, property occupancy or vacancy, primary home, vacation/seasonal residence, unoccupied, position of decision-making authority in property administration entity, profiles of condo association members, co-op board, or homeowners' association, inbound vs. outbound contact or marketing, response to a solicitation vs. actively seeking protection, applicant credit score, and claims history.

6. The system of claim 1 wherein the processor:
   determines expected losses and residual deductibles including expected loss from assessment, expected loss from increased maintenance obligation, expected residual deductible after assessment, and expected residual retained liability; and
   calculates reimbursement payment by determining reimbursement for assessment, residual retained liability, and reimbursement for annual increase in maintenance.

7. The system of claim 6 wherein the reimbursement payment includes a residual amount over a given deductible for a duration of a period of an increase in property ownership expenses up to a coverage period.

8. The system of claim 1 wherein the database includes actuarial information or tables and records useful for risk and underwriting evaluation.

9. The system of claim 1 wherein the one or more data servers includes credit agency servers and public records servers.

10. The system of claim 1 wherein the increases in property ownership expenses include increases in assessments, maintenance costs, homeowners' association fees, and taxes.

11. The system of claim 1 wherein the information from the data sources include at least one of duration of unit ownership, property location, susceptibility to storm damage, insurance costs, repair costs, neighborhood and building demographics, average household income within the unit's building and neighborhood, property age, property construction class, property amenities, number of units within the building, number of floors, unit pricing history, unit maintenance pricing history, risk exposure, property tax rates and assessed values, property occupancy or vacancy, decision-making authority of applicant in property administration entity, profiles of condo association members, applicant credit score, and claims history.

12. A system for handling data field tasks, the system comprising:
   a processor; and
   a memory having executable instructions stored thereon that when executed by the processor cause the processor to:
   configure processes to data sources over a communications network;
   generate data source connections to electronically receive information from the data sources, the data sources including one or more data servers;
   aggregate electronic content that is associated with real estate ownership expenses from the one or more data servers;
   analyze the electronic content to determine trends, risk, and behaviors;
   generate quotes for real estate ownership expense insurance policies that reimburse for increases in property ownership expenses based on the analysis of the electronic content;
   allocate, in an operating system, threads within the processes to at least one data field in a memory location;
   schedule the threads to retrieve the information from the data sources; and
   assign the threads to tasks for performing operations on the at least one data fields based on the information from the data sources, wherein at least one of the threads performs an operation on the at least one of the data fields using the analysis of the electronic content.

13. The system of claim 12 wherein the processor further assesses the risk based on at least one of: a credit report and criminal record of the property owner, tax history of the property, building and area demographics, building permits, and maintenance pricing history.

14. The system of claim 12 wherein the processor further assesses the risk based on factors including duration of unit ownership, property location, susceptibility to storm damage, insurance costs, repair costs, neighborhood and building demographics, average household income within the building and neighborhood, property age, property construction class, property amenities, number of units, number of floors, property/unit pricing history, property/unit maintenance pricing history, risk exposure, property tax rates and assessed values, property occupancy or vacancy, primary home, vacation/seasonal residence, unoccupied, position of decision-making authority in property administration entity, profiles of condo association members, co-op board, or homeowners' association, inbound vs. outbound contact or marketing, response to a solicitation vs. actively seeking protection, applicant credit score, and claims history.

15. The system of claim 12 wherein the processor:
   determines expected losses and residual deductibles including expected loss from assessment, expected loss from increased maintenance obligation, expected residual deductible after assessment, and expected residual retained liability; and
   calculates reimbursement payment by determining reimbursement for assessment, residual retained liability, and reimbursement for annual increase in maintenance.

16. The system of claim 15 wherein the reimbursement payment includes a residual amount over a given deductible for a duration of a period of an increase in property ownership expenses up to a coverage period.

17. Non-transitory computer-readable media comprising program code that when executed by a programmable processor causes execution of a method for handling data field tasks, the computer-readable media comprising:
   computer program code for configuring processes to data sources over a communications network;
   computer program code for generating data source connections to electronically receive information from the data sources, the data sources including one or more data servers;
   computer program code for aggregating electronic content that is associated with real estate ownership expenses from the one or more data servers;
   computer program code for analyzing the electronic content to determine trends, risk, and behaviors;
   computer program code for generating quotes for real estate ownership expense insurance policies that reimburse for increases in property ownership expenses based on the analysis of the electronic content
   computer program code for allocating, in an operating system, threads within the processes to at least one data field in a memory location;
   computer program code for scheduling the threads to retrieve the information from the data sources; and
   computer program code for assigning the threads to tasks for performing operations on the at least one data fields based on the information from the data sources, wherein at least one of the threads performs an operation on the at least one of the data fields using the analysis of the electronic content.

18. The non-transitory computer-readable media of claim 17 further comprising computer program code for assessing the risk based on at least one of: a credit report and criminal record of the property owner, tax history of the property, building and area demographics, building permits, and maintenance pricing history.

19. The non-transitory computer-readable media of claim 17 further comprising computer program code for assessing the risk based on factors including duration of unit ownership, property location, susceptibility to storm damage, insurance costs, repair costs, neighborhood and building demographics, average household income within the building and neighborhood, property age, property construction class, property amenities, number of units, number of floors, property/unit pricing history, property/unit maintenance pricing history, risk exposure, property tax rates and assessed values, property occupancy or vacancy, primary home, vacation/seasonal residence, unoccupied, position of decision-making authority in property administration entity, profiles of condo association members, co-op board, or homeowners' association, inbound vs. outbound contact or marketing, response to a solicitation vs. actively seeking protection, applicant credit score, and claims history.

20. The non-transitory computer-readable media of claim 17 further comprising:
   computer program code for determining expected losses and residual deductibles including expected loss from assessment, expected loss from increased maintenance obligation, expected residual deductible after assessment, and expected residual retained liability; and
   computer program code for calculating reimbursement payment by determining reimbursement for assessment, residual retained liability, and reimbursement for annual increase in maintenance.

* * * * *